(12) United States Patent
Yu et al.

(10) Patent No.: US 10,003,423 B2
(45) Date of Patent: Jun. 19, 2018

(54) HALF-CYCLED ORTHOGONAL FREQUENCY DIVISIONAL MULTIPLEXING TRANSMISSION AND RECEPTION

(71) Applicant: ZTE (USA) Inc., Austin, TX (US)

(72) Inventors: Jianjun Yu, Basking Ridge, NJ (US); Fan Li, Morristown, NJ (US)

(73) Assignee: ZTE (USA) Inc., Richardson, TX (US)

( * ) Notice: Subject to any disclaimer, the term of this patent is extended or adjusted under 35 U.S.C. 154(b) by 0 days. days.

(21) Appl. No.: 14/891,598

(22) PCT Filed: May 15, 2014

(86) PCT No.: PCT/US2014/038254
§ 371 (c)(1),
(2) Date: Nov. 16, 2015

(87) PCT Pub. No.: WO2014/186610
PCT Pub. Date: Nov. 20, 2014

(65) Prior Publication Data
US 2016/0087740 A1    Mar. 24, 2016

Related U.S. Application Data

(60) Provisional application No. 61/824,324, filed on May 16, 2013.

(51) Int. Cl.
*H04J 11/00* (2006.01)
*H04B 10/40* (2013.01)
(Continued)

(52) U.S. Cl.
CPC .......... *H04J 11/00* (2013.01); *H04B 10/5563* (2013.01); *H04J 14/0298* (2013.01);
(Continued)

(58) Field of Classification Search
CPC .......... H04B 10/5563; H04L 25/03343; H04L 25/03821; H04L 27/2643; H04L 27/263; H04J 14/0298; H04J 11/00
(Continued)

(56) References Cited

U.S. PATENT DOCUMENTS 5,732,113 A * 3/1998 Schmidl ................ H04L 5/0048
375/354
6,584,092 B1 * 6/2003 Sudo .................... H04L 27/2662
370/344
(Continued)

FOREIGN PATENT DOCUMENTS

EP    1 211 836 A1    6/2002
JP    08-097798 A    4/1996
(Continued)

OTHER PUBLICATIONS

Fernando et al, Flip OFDM for Unipolar Communication Systems, Dec. 2012, IEEE, pp. 3726-3733.*
(Continued)

*Primary Examiner* — Ken N Vanderpuye
*Assistant Examiner* — Dibson Sanchez
(74) *Attorney, Agent, or Firm* — Perkins Coie LLP

(57) ABSTRACT

An optical transmitter transmits an orthogonal frequency division multiplexing symbol in which only one-half of available subcarriers are modulated with data and the remaining subcarriers are suppressed by not modulating with data. The transmission is of duration equal to half the symbol period of the OFDM symbol, resulting in a half-cycle transmission. An optical receiver receives the half-cycle transmission OFDM symbol, regenerates the full time domain representation and recovers data modulated on the
(Continued)

one-half of available subcarriers. The modulated subcarriers and the suppressed subcarriers alternate in the frequency domain.

20 Claims, 19 Drawing Sheets

(51) Int. Cl.
*H04B 10/556* (2013.01)
*H04L 25/03* (2006.01)
*H04L 27/26* (2006.01)
*H04J 14/02* (2006.01)

(52) U.S. Cl.
CPC .. *H04L 25/03343* (2013.01); *H04L 25/03821* (2013.01); *H04L 27/263* (2013.01); *H04L 27/2643* (2013.01)

(58) Field of Classification Search
USPC .......................................... 398/76, 135–139
See application file for complete search history.

(56) References Cited

U.S. PATENT DOCUMENTS

| | | | |
|---|---|---|---|
| 6,650,617 B1 * | 11/2003 | Belotserkovsky | H04L 25/03159 370/208 |
| 7,693,129 B1 * | 4/2010 | Kishore | H04L 27/2657 370/210 |
| 8,693,459 B2 * | 4/2014 | Youn | H04B 10/532 370/350 |
| 8,737,191 B2 * | 5/2014 | Freda | H04L 27/2602 398/76 |
| 2002/0021750 A1 * | 2/2002 | Belotserkovsky | H04L 25/03038 375/232 |
| 2002/0172147 A1 * | 11/2002 | Matsumoto | H04L 27/2647 370/208 |
| 2003/0031272 A1 | 2/2003 | Matsumoto | |
| 2003/0112743 A1 * | 6/2003 | You | H04L 27/2663 370/203 |
| 2004/0190438 A1 | 9/2004 | Maltsev et al. | |
| 2005/0271387 A1 * | 12/2005 | Kee | H04B 10/2543 398/140 |
| 2006/0140288 A1 * | 6/2006 | Holden | H04L 27/24 375/260 |
| 2007/0053465 A1 * | 3/2007 | Koo | H04L 27/2613 375/303 |
| 2007/0258512 A1 * | 11/2007 | Green | H04L 27/2003 375/150 |
| 2009/0175365 A1 * | 7/2009 | Jun | H04L 27/2608 375/260 |
| 2009/0220239 A1 * | 9/2009 | Armstrong | H04B 10/548 398/81 |
| 2010/0215371 A1 * | 8/2010 | Djordevia | H03M 13/31 398/79 |
| 2011/0176815 A1 | 7/2011 | Frankel et al. | |
| 2011/0280238 A1 * | 11/2011 | Kreuzer | H04L 5/0042 370/347 |
| 2011/0286747 A1 * | 11/2011 | Lowery | H04B 10/25759 398/115 |
| 2012/0170680 A1 * | 7/2012 | Stern | H04L 5/0039 375/299 |
| 2012/0224866 A1 * | 9/2012 | Gaete | H04L 27/2096 398/186 |
| 2013/0107975 A1 | 5/2013 | Castelain | |
| 2014/0079164 A1 * | 3/2014 | Zhang | H04L 27/2601 375/343 |

FOREIGN PATENT DOCUMENTS

| | | |
|---|---|---|
| JP | 2002-064461 A | 2/2002 |
| JP | 2012-222561 A | 11/2012 |

OTHER PUBLICATIONS

Wu et al, Tunable optical wavelength conversion of OFDM signal using a periodically poled lithium niobate, May 2009, OSA, pp. 9177-9182.*
Ali, A., et al., "Optical Biasing in Direct Detection Optical-OFDM for Improving Receiver Sensitivity," Optical Fiber Communication Conference, OSA Technical Digest (CD) (Optical Society of America, 2010), Paper JThA12, pp. 1-3, Mar. 2010.
Cao, Z., et al., "Direct-Detection Optical OFDM Transmission System Without Frequency Guard Band," IEEE Photonics Technology Letters, 22(11):736-738, Jun. 2010.
International Search Report and Written Opinion dated Oct. 13, 2014 for International Application No. PCT/US2014/038254, filed on May 15, 2014 (9 pages).
Liu, B., et al., "A WDM-OFDM-PON architecture with centralized lightwave and PoISK-modulated multicast overlay," Optics Express, 18(3):2137-2143, Feb. 2010.
Lowery, A. J., "Improving Sensitivity and Spectral Efficiency in Direct-Detection Optical OFDM Systems," Optical Fiber Communication Conference/National Fiber Optic Engineers Conference, OSA Technical Digest (CD) (Optical Society of America, 2008), Paper OMM4, pp. 1-3, Feb. 2008.
Lowery, A. J., et al., "Orthogonal-frequency-division multiplexing for dispersion compensation of long-haul optical systems," Optics Express, 14(6):2079-2084, Mar. 2006.
Peng, W.-R., et al., "Experimental Demonstration of a Coherently Modulated and Directly Detected Optical OFDM System Using an RF-Tone Insertion," Optical Fiber Communication Conference/National Fiber Optic Engineers Conference, OSA Technical Digest (CD) (Optical Society of America, 2008), Paper OMU2, pp. 1-3, Feb. 2008.
Peng, W.-R., et al., "Theoretical and Experimental Investigations of Direct-Detected RF-Tone-Assisted Optical OFDM Systems," Journal of Lightwave Technology, 27(10):1332-1339, May 2009.
Tao, L., et al., "Analysis of Noise Spread in Optical DFT-S OFDM Systems," Journal of Lightwave Technology, 30 (20):3219-3225, Oct. 2012.
Tao, L., et al., "Reduction of Intercarrier Interference Based on Window Shaping in OFDM RoF Systems," IEEE Photonics Technology Letters, 25(9):851-854, May 2013.
Wang, C.-Y., et al., "Direct-detection polarization division multiplexed orthogonal frequency-division multiplexing transmission systems without polarization tracking," Optics Letters, 37(24):5070-5072, Dec. 2012.
Wei, C.-C., "Small-signal analysis of OOFDM signal transmission with directly modulated laser and direct detection," Optics Letters, 36(2):151-153, Jan. 2011.
Xin, X., et al., "Dynamic A-OFDMA with selective multicast overlaid," Optics Express, 19(8):7847-7855, Apr. 2011.
Yang, Q., et al., "Guard-band influence on orthogonal-bandmultiplexed coherent optical OFDM," Optics Letters, 33 (19):2239-2241, Oct. 2008.
Yu, J., et al., "Centralized Lightwave WDM-PON Employing 16-QAM Intensity Modulated OFDM Downstream and OOK Modulated Upstream Signals," IEEE Photonics Technology Letters, 20(18):1545-1547, Sep. 2008.
Zhang, L., et al., "MAMSK-OFDM Signal for RoF Access With Increased Tolerance Toward Frequency Offset," IEEE Photonics Technology Letters, 25(4):397-400, Feb. 2013.
Japanese Office Action dated Feb. 7, 2017 for Japanese Patent Application No. 2016-514100, filed on May 15, 2014 (10 pages).

* cited by examiner

Time and frequency domain of odd/even-subcarriers modulated scheme

HALF-CYCLED ORTHOGONAL FREQUENCY DIVISIONAL MULTIPLEXING TRANSMISSION AND RECEPTION

CROSS-REFERENCE TO RELATED APPLICATIONS

This patent document claims the benefit of priority of U.S. Provisional Patent Application No. 61/824,324, filed on May 16, 2013. The entire contents of the before-mentioned patent application is incorporated by reference herein.

BACKGROUND

This patent document relates to digital communication, and, in one aspect, orthogonal frequency division multiplexing in optical communication.

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing.

SUMMARY

In some disclosed embodiments, a half-cycled DDO-OFDM transmission and reception was successfully demonstrated to resist SSMI without spectra efficiency reduction for the first time. The receiver sensitivity was improved by 2 and 1.5 dB in QPSK and 16QAM OFDM with 40-km SSMF-28 transmission, respectively.

In one disclosed aspect, methods, apparatus and a computer program product for optical transmission include transmitting a half cycle of an OFDM symbol during a time period of duration T/2, wherein T represents a symbol period of the OFDM symbol and wherein the OFDM symbol comprises multiple subcarriers of which alternating subcarriers are suppressed by refraining from modulating with data.

In another aspect a method, apparatus and a computer program product for storing code for receiving a half cycle of an OFDM symbol during a time period of duration T/2, wherein T represents a symbol period of the OFDM symbol and wherein the OFDM symbol comprises multiple subcarriers of which alternating subcarriers are suppressed by refraining from modulating with data and recovering data from the received half cycle of the OFDM symbol are disclosed.

In yet another aspect, an optical communication system is disclosed comprising a transmitter that is configured to transmit a half-cut version of a modulated OFDM symbol and a receiver that is configured to receive the half-cut version, regenerate the full version of the OFDM symbol and recover data modulated in the OFDM symbol.

DETAILED DESCRIPTION

Figure 7:
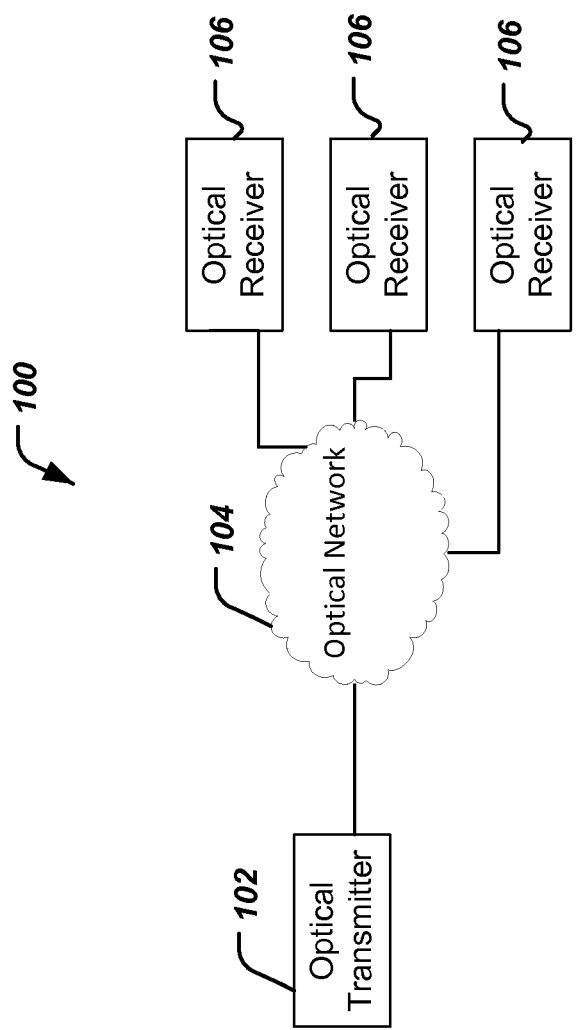
FIG. 7 depicts an optical communication system.

FIG. 7 depicts an optical communication system 100 in which the presently disclosed technology can be practiced. One or more optical transmitters 102 are communicatively coupled via an optical network 104 with one or more optical receivers 106. The optical transmitters 102 and receivers 106 may, e.g., by optical line termination (OLTs) and optical network units (ONUs) of an optical network or passive optical repeater equipment, and so on. The optical network 104 may comprise optical fibers that extend in length from several hundred feet (e.g., last mile drop) to several kilometers (long haul networks). The transmitted optical signals may go through intermediate optical equipment such as amplifiers, repeaters, switch, etc., which are not shown in FIG. 7 for clarity.

Adding capacity increase the amount of data that can be carried across the optical network 104 often requires laying down new optical fibres. But this option is expensive due to capital expenditure required both to lay down fibre and adding new equipment at the transmitting and receiving end of the fibre. As an alternative, optical network operators and vendors are constantly looking for new techniques to be able to carry data more densely (e.g., greater bits per wavelength efficiency, or spectral efficiency).

To this end, optical orthogonal frequency division multiplexing (OFDM) has attracted attention due to its high spectral efficiency (SE) and robustness to transmission impairments enabled by digital signal processing (DSP). Based on configurations of optical receivers, the implementation of optical OFDM systems has two categories: direct-detected optical OFDM (DDO-OFDM) and coherent optical OFDM (CO-OFDM). In CO-OFDM systems, the cost of implementation is typically high due to the complicated receiver structure and complex signal processing in the transmitter and receiver. This largely limits its application in low cost access networks. Taking the advantages of simple and cost-effective configuration, the DDO-OFDM system is suitable for use in access network for short reach.

In a typical DDO-OFDM system, OFDM signal degrades by subcarrier-subcarrier mixing interference (SSMI) after square-law detection via the photodiode (PD) in the receiver. In some embodiments, the frequency guard-band was proposed to prevent SSMI from OFDM signal. Another scheme, called interleaved OFDM, was applied in the DDO-OFDM to eliminate the impact of SSMI by inserting data only in even subcarriers. Both these schemes can effectively mitigate the distortions introduced by SSMI, while the system SE will be decreased by a factor of two. In order to maintain high SE, bit interleaver and turbo code techniques may be used to combat the SSMI in the 64-ary quadrature-amplitude-modulation (64QAM) DD-OFDM system with 100-km transmission. These techniques can mitigate the SSMI effectively, but the SE will still be degraded due to the utilization of turbo code. Moreover, the complexity due to forward-error-correction (FEC) decoding may limit its applications. The present document discloses a half-cycled DDO-OFDM transmission and reception technique that can be used, in one aspect, to resist SSMI without SE reduction. In some embodiments, the receiver sensitivity was improved by 2 and 1.5 dB in QPSK and 16QAM OFDM with 40-km SSMF-28 transmission, respectively.

Figure 1A:
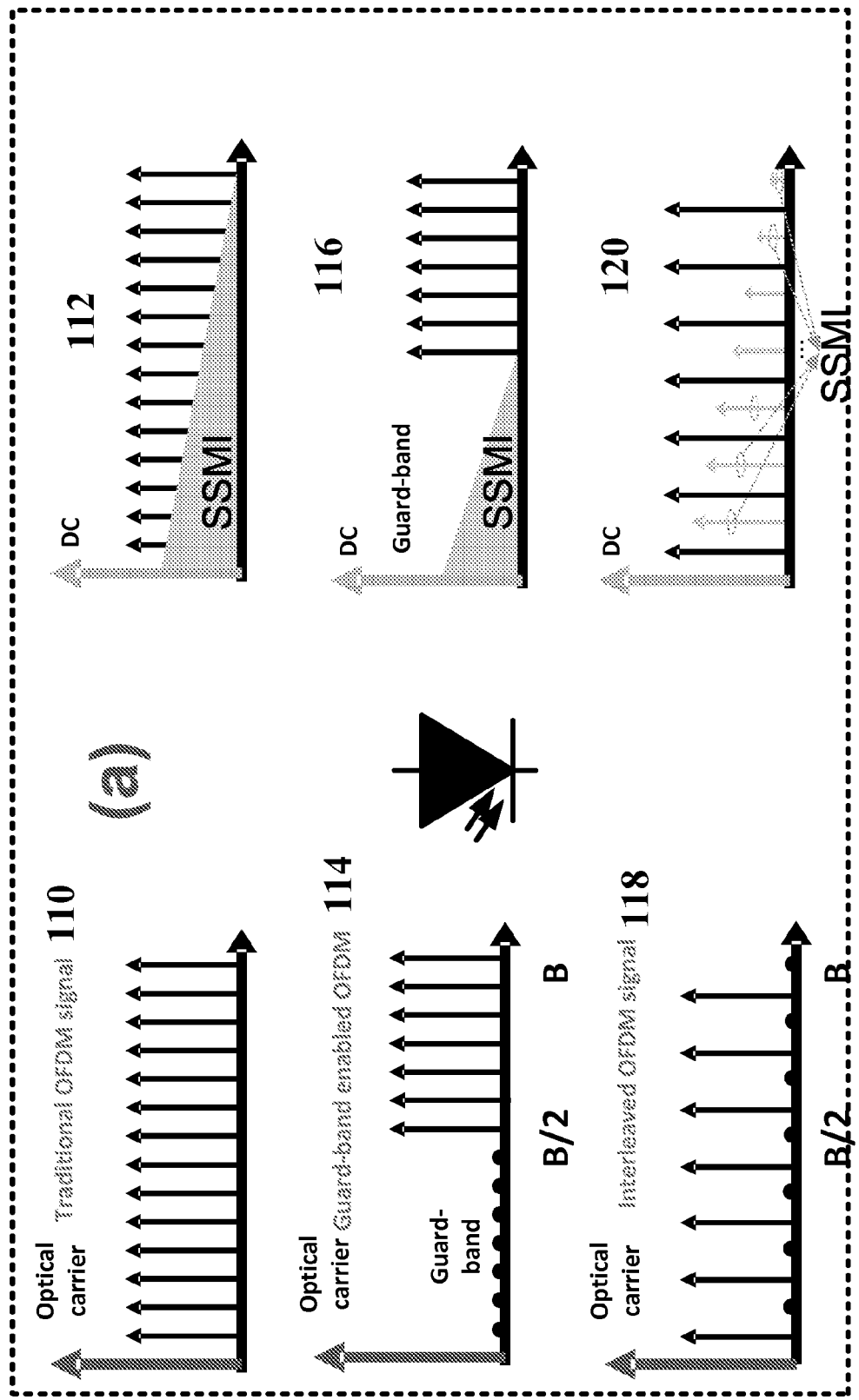
FIG. 1A depicts three different variations of direct detected optical orthogonal frequency division multiplexed (DDO-OFDM) signals.

FIG. 1A shows the concept of three different types of OFDM signals that can be used in DDO-OFDM. The first one (110) is a traditional OFDM signal, after PD the SSMI will spread in the whole OFDM signal band (112), and the bit-error ratio (BER) performance of signal will be seriously degraded. The second one (114) is guard-band enabled OFDM signal for which the SSMI is located only in the guard-band and the BER performance can be improved with reduced SE (116). The third one (118) is interleaved OFDM signal in which data is only modulated onto the even subcarriers. In this case, no data is modulated on alternating (odd) subcarriers (i.e., subcarriers having odd index, when enumerated within a symbol). After the PD the SSMI will distribute only in the odd subcarriers (120), and data only modulated on the even subcarriers is immune to the SSMI. In the SSMI cancellation scheme with the interleaved OFDM signal, the OFDM symbol will exhibit symmetric in the time domain when data only modulated onto the even/odd subcarriers.

Based on these observations, a half-cycled DDO-OFDM technique is disclosed in this document. The IFFT size during the OFDM modulation is represented by N (an integer) and the time length of one OFDM symbol is represented by time T, after IFFT, the OFDM signal can be expressed as $$s(t) = \sum_{k=0}^{N-1} c_k \exp(j2\pi f_k t) \ (1 \le t \le T) \quad (1)$$

in which the k represents the index of subcarriers, the $f_k$ is the frequency of the $k_{th}$ subcarrier and can be given as $$f_k = k\Delta f = k/T \quad (2)$$

In the time domain, the first half and second half of one OFDM symbol can be expressed as $$s(t_1) = \sum_{k=0}^{N-1} c_k \exp(j2\pi f_k t_1) \ (1 \le t_1 \le T/2) \quad (3)$$

$$s(t_2) = \sum_{k=0}^{N-1} c_k \exp(j2\pi f_k t_2) \ (T/2 + 1 \le t_2 \le T) \quad (4)$$

As $t_2 = t_1 + T/2$, the second half can be expressed as $$\begin{aligned} s(t_1 + T/2) &= \sum_{k=0}^{N-1} c_k \exp(j2\pi f_k (t_1 + T/2)) \\ &= \sum_{k=0}^{N-1} c_k \exp(j2\pi f_k t_1 + jk\pi) \\ &= \sum_{k=0}^{N-1} c_k (\cos k\pi + j\sin k\pi) \exp(j2\pi f_k t_1) \\ &= \sum_{k=0}^{N-1} c_k \cos k\pi \exp(j2\pi f_k t_1) \ (1 \le t_1 \le T/2) \end{aligned} \quad (5)$$

In order to further simplify the formula, the index for sub-carriers is from 0 to N−1, the index of even and odd subcarriers can be expressed as m and n, respectively. The first half and second half of one OFDM symbol can be expanded as $$s(t_1) = \sum_{n=1}^{N-1} c_n \exp(j2\pi f_n t_1) + \sum_{m=0}^{N-2} c_m \exp(j2\pi f_m t_1) \ (1 \le t_1 \le T/2) \quad (6)$$

$$\begin{aligned} s(t_2) &= s(t_1 + T/2) \\ &= \sum_{k=0}^{N-1} c_k \cos k\pi \exp(j2\pi f_k t_1) \\ &= \sum_{n=1}^{N-1} c_n \cos n\pi \exp(j2\pi f_n t_1) + \sum_{m=0}^{N-2} c_m \cos m\pi \exp(j2\pi f_m t_1) \\ &= \sum_{n=1}^{N-1} -c_n \exp(j2\pi f_n t_1) + \sum_{m=0}^{N} c_m \exp(j2\pi f_m t_1) \ (1 \le t_1 \le T/2) \end{aligned} \quad (7)$$

In the interleaved OFDM scheme, subcarriers with even index are reserved without data mapping to resist SSMI, which means $c_m$ are set to be "0"s, the first half and second half of one OFDM symbol can be simplified as $$s(t_1) = \sum_{n=1}^{N-1} c_n \exp(j2\pi f_n t_1) \ (1 \le t_1 \le T/2) \quad (8)$$

$$\begin{aligned} s(t_2) &= \sum_{n=1}^{N-1} -c_n \exp(j2\pi f_n t_1) \\ &= -s(t_1) \ (t_2 = T/2 + t_1) \end{aligned} \quad (9)$$

From Eq. (8) and (9), it can be seen that the first half and second half in one OFDM symbol demonstrate the same amplitude with 180° phase shift in the time-domain. To use this redundancy, in some embodiments, the second half of transmission is simply eliminated during the transmission.

By this way, the time length used to convey data transmission can be shortened to T/2, and the SE can be maintained the same as traditional OFDM signal after this process.

Figure 1B:
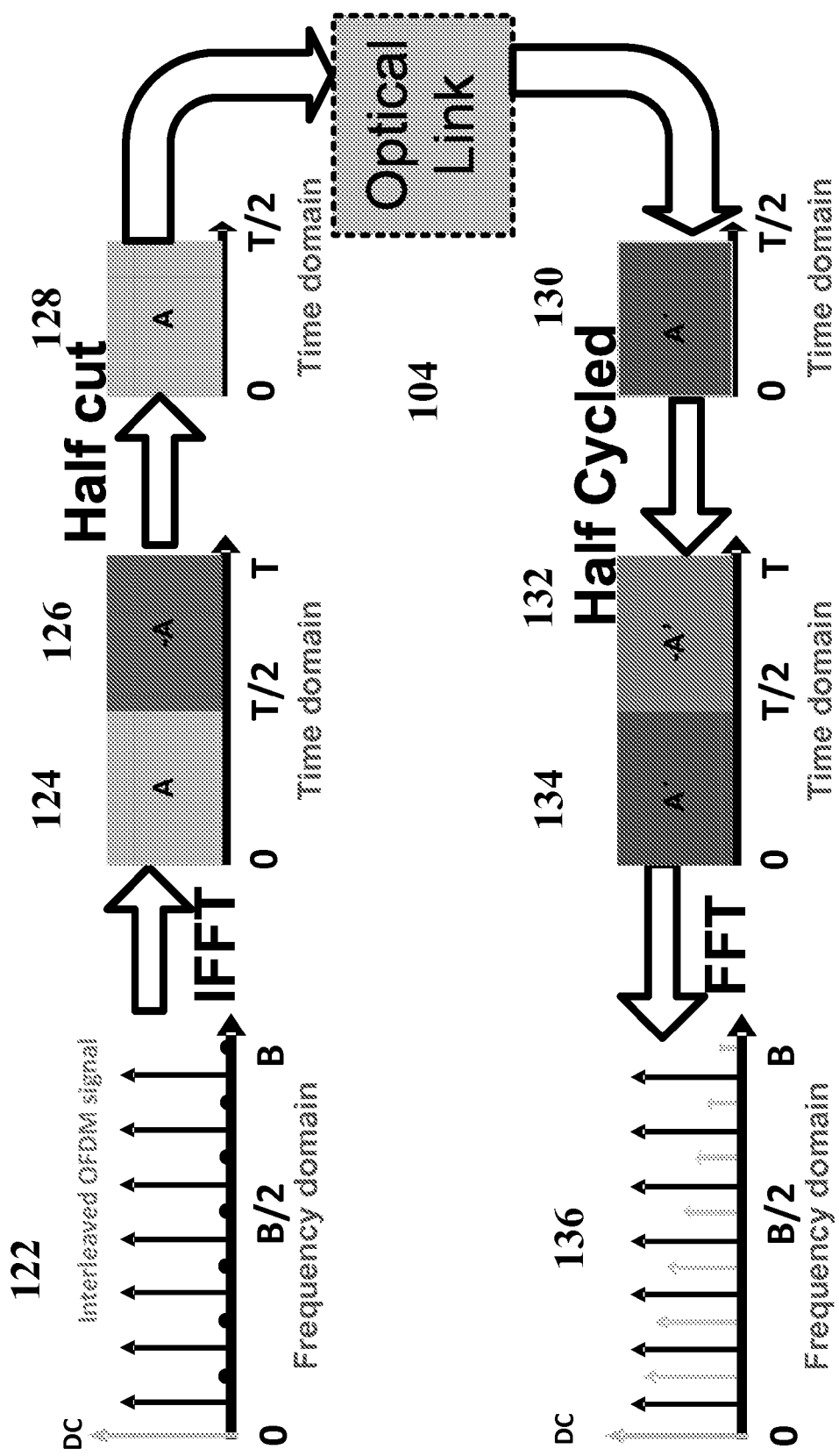
FIG. 1B depicts a block diagram of an implementation of a half-cycled DDO-OFDM.

FIG. 1B shows the structure of an end-to-end transmission and reception system of a half-cycled DDO-OFDM embodiment. First, data is modulated only onto even subcarriers just the same as the interleaved OFDM signal in the frequency domain (graph 122). Next, an inverse fast Fourier transform (IFFT) is applied to realize OFDM modulation. After IFFT, the period of one OFDM symbol is T while the first half (124) and the second half (126) demonstrate the same amplitude with 180 degree phase shift in the time domain (represented as "A" and "−A"). The second half 126 (second half cycle) is cut during the transmission. In other words, only a version of the first half 124, represented as signal 128, is transmitted. Ideally this version is identical to the first half 124. Thus, the time length used to convey data transmission is shortened to T/2, while the SE will maintain the same as traditional OFDM signal after this process. After electrical-to-optical (E/O) and optical-to-electrical (O/E) conversion (not shown in the figure), as the fiber link 104 can be regarded as an approximate time invariant system, the transmitted signal 128 is recovered as a [0, T/2] signal 130 (represented as "A'"). The second half OFDM symbol (132) can be recovered by half cycled of the first half OFDM symbol (134, ideally identical to 130). Next, FFT is applied to realize OFDM demodulation, and after demodulation the SSMI will distribute in the odd subcarriers (136). As can be seen from FIG. 1B in the half-cycled DDO-OFDM, the cancellation of SSMI can be implemented without decreasing SE.

Figures 1C, 1D:
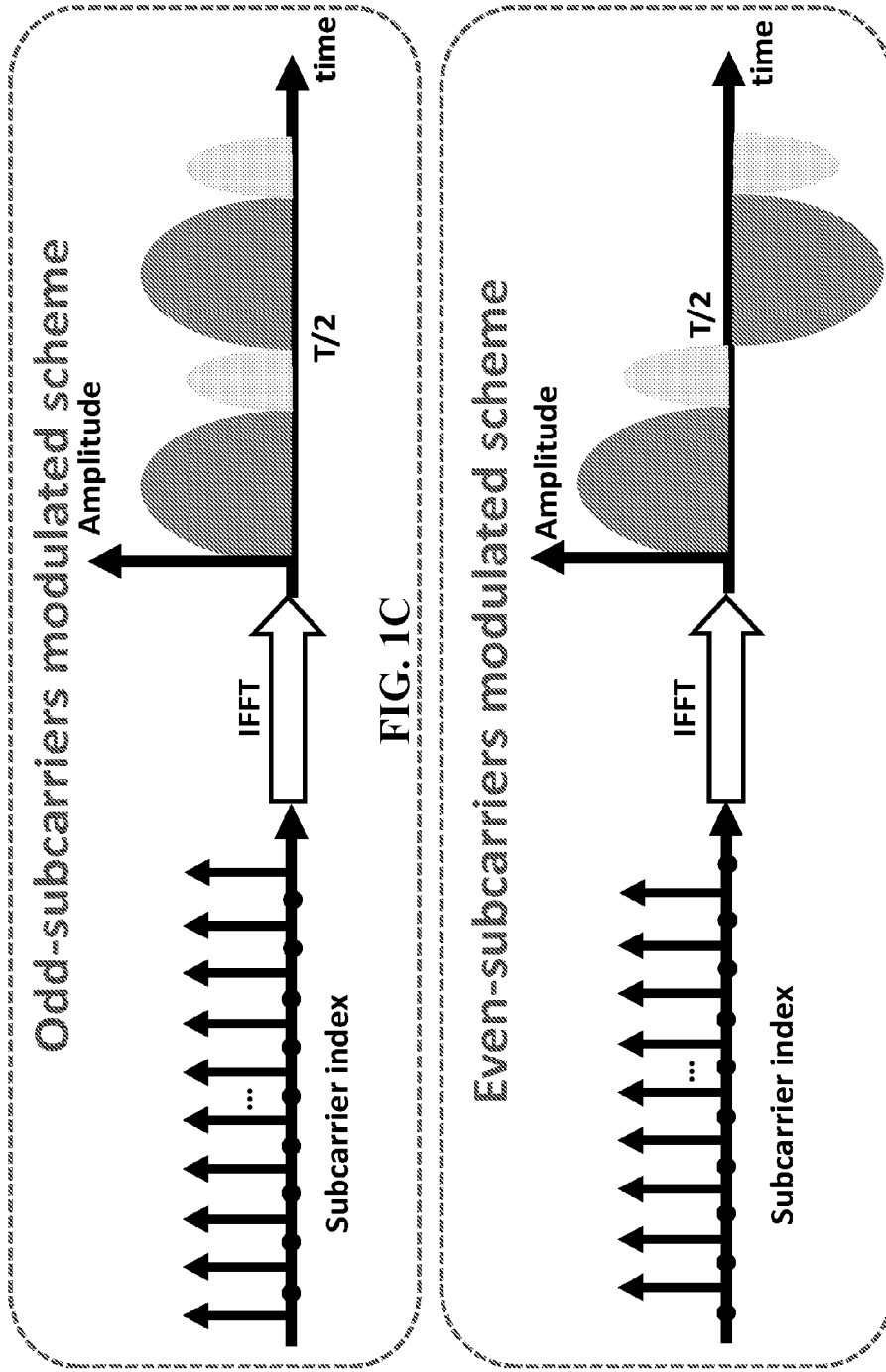
FIG. 1C represents an embodiment in which odd-subcarriers of an OFDM symbol are modulated with data.
FIG. 1D represents an embodiment in which even-subcarriers of an OFDM symbol are modulated with data.

FIG. 1C shows an example half-cycle modulation scheme where odd subcarriers are used for modulation, with even subcarriers being suppressed by not modulating any data onto these subcarriers. As can be seen, the resulting spectrum after IFFT is symmetric in the first half cycle and the second half cycle.

FIG. 1D shows an example half-cycle modulation scheme where even subcarriers are used for modulation, with odd subcarriers being suppressed by not modulating any data onto these subcarriers. As can be seen, the resulting spectrum after IFFT in the second half cycle is a shifted and negative image of the spectrum in the first half of the cycle.

With reference to FIGS. 1E to 1J, examples for 32-subcarrier OFDM case are depicted.

Figure 1E:
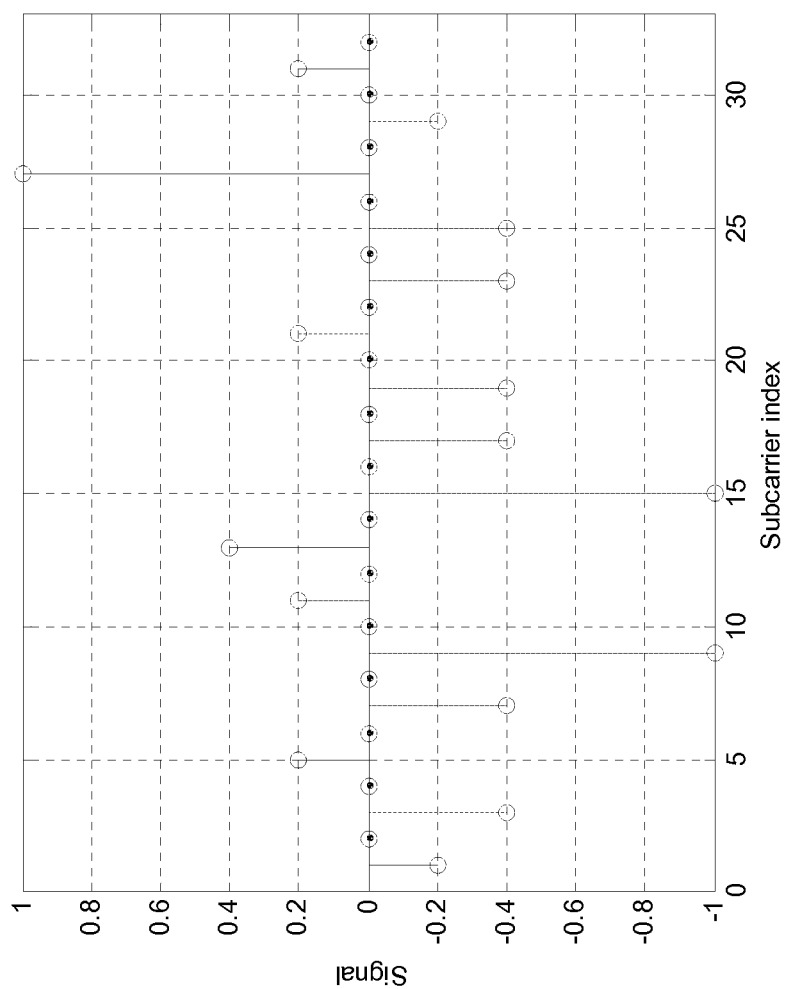
FIG. 1E represents spectrum of odd-subcarrier modulated OFDM signal.

FIG. 1E is a graph showing the subcarrier modulation for the case described in FIG. 1C.

Figure 1F:
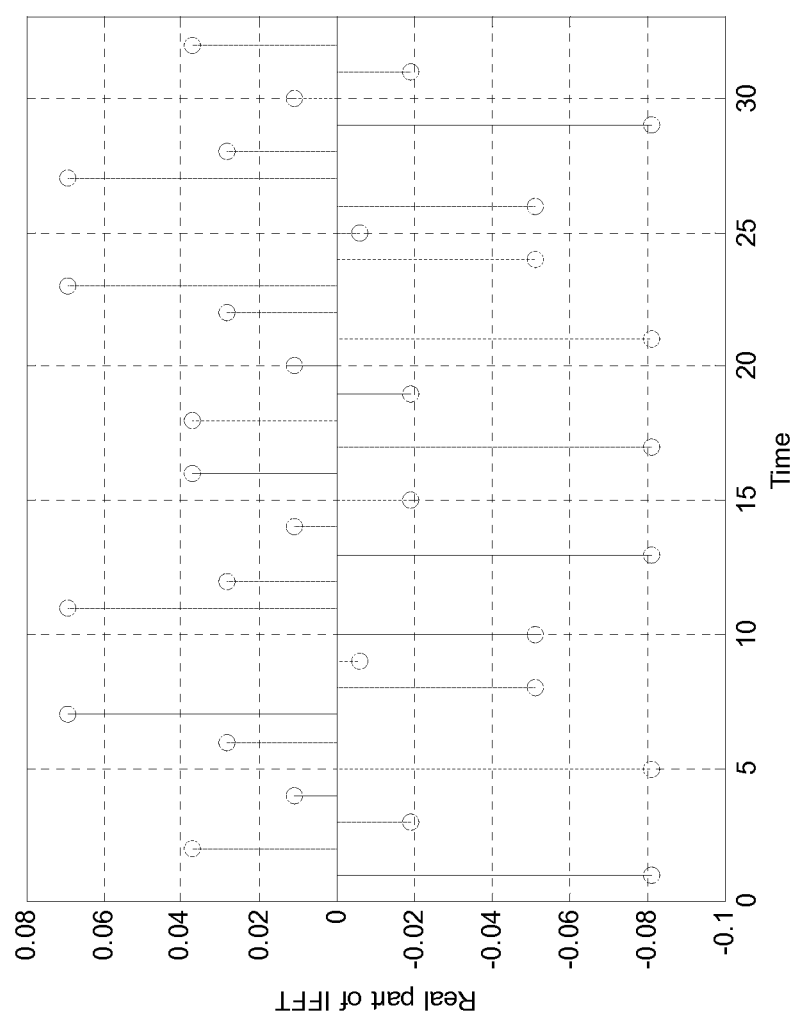
FIG. 1F depicts real part of odd-subcarrier modulated OFDM signal after IFFT.

FIG. 1F shows the real part of the spectrum after IFFT conversion of the modulation described in FIG. 1C.

Figure 1G:
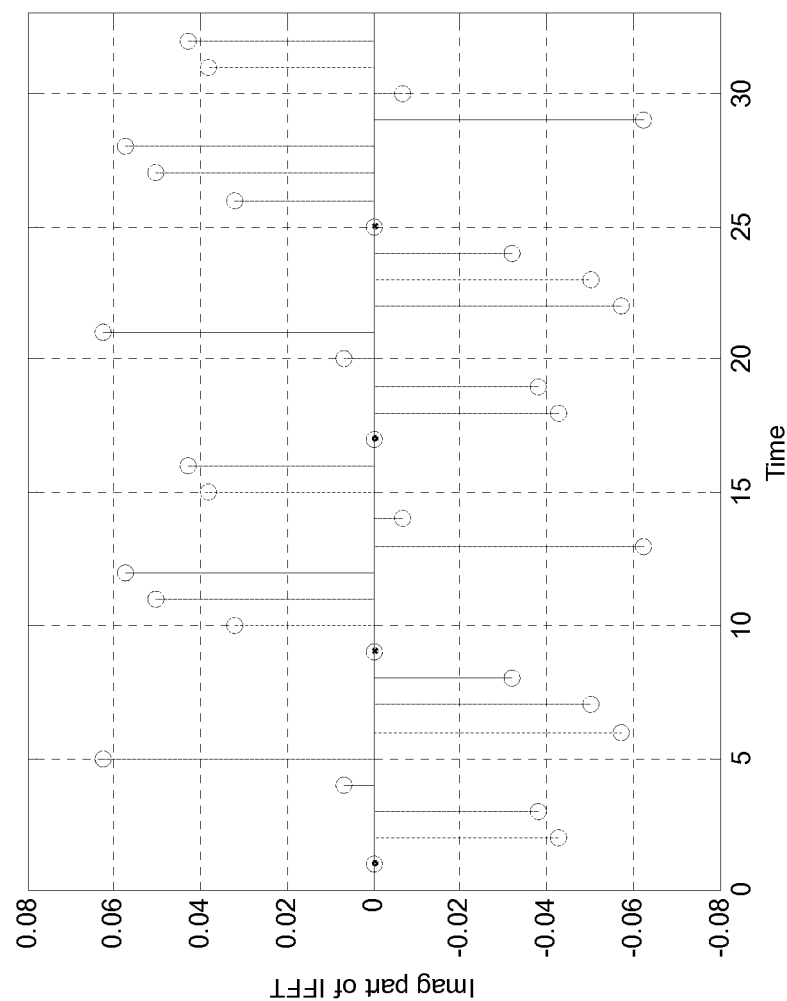
FIG. 1G depicts imaginary part of odd-subcarrier modulated OFDM signal after IFFT.

FIG. 1G shows the imaginary part of the spectrum after IFFT conversion of the modulation described in FIG. 1C.

Figure 1H:
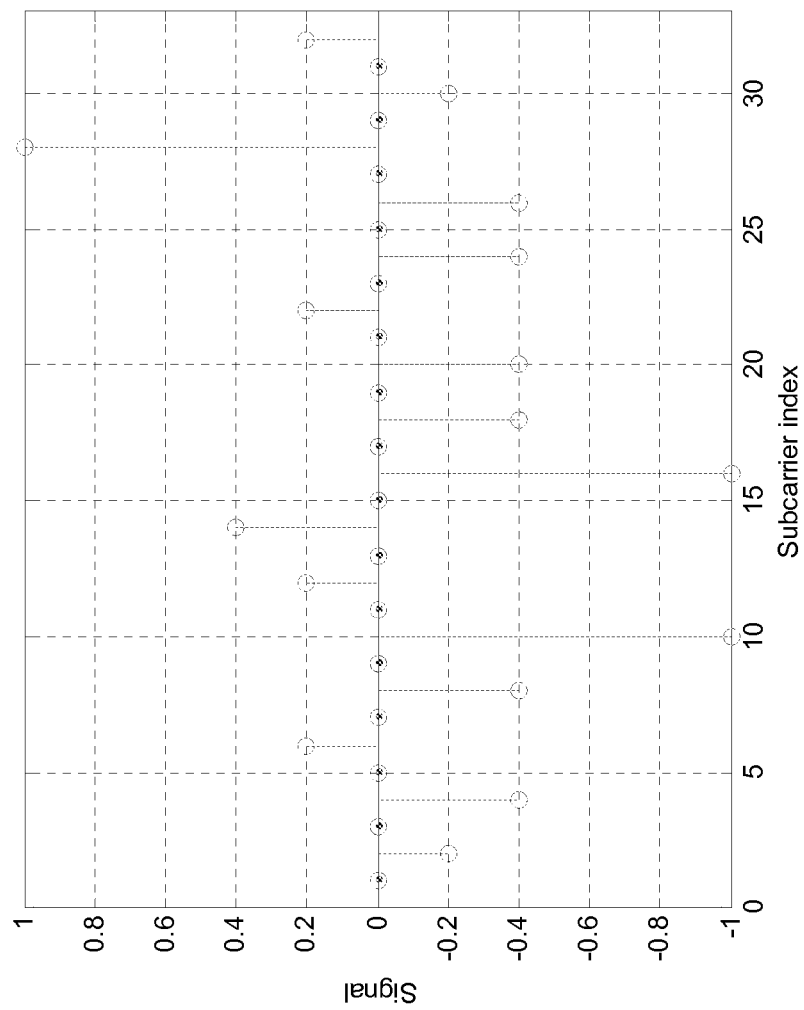
FIG. 1H represents spectrum of even-subcarrier modulated OFDM signal.

FIG. 1H is a graph showing the subcarrier modulation for the case described in FIG. 1D.

Figure 1I:
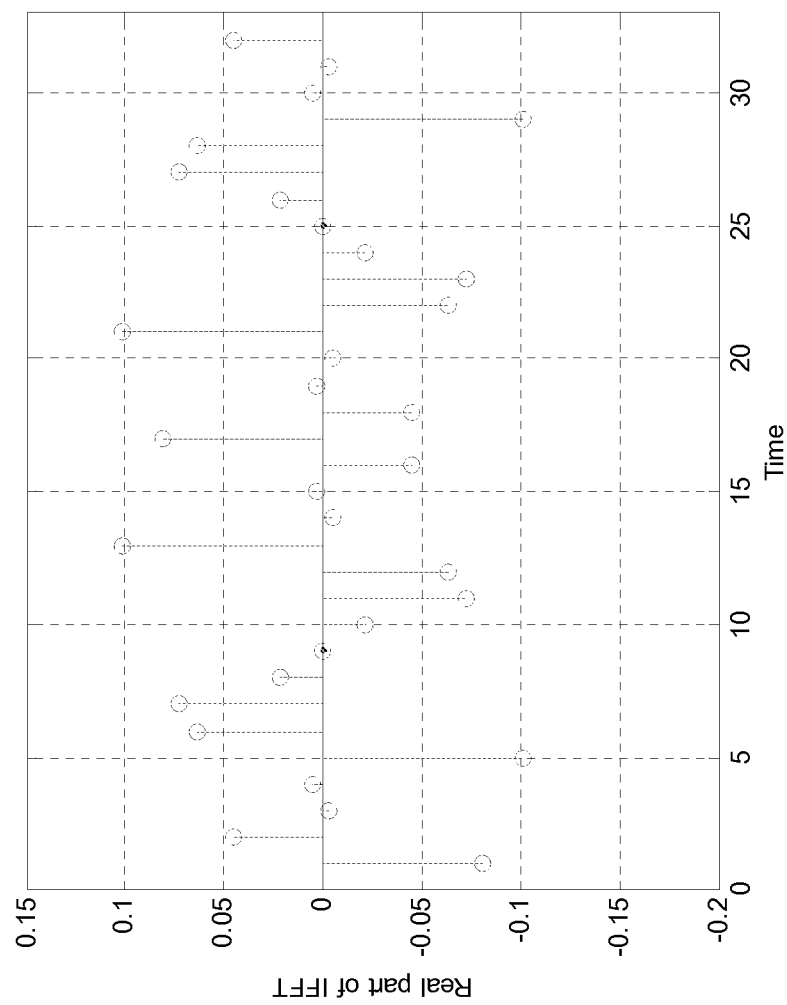
FIG. 1I depicts real part of even-subcarrier modulated OFDM signal after IFFT.

FIG. 1I shows the real part of the spectrum after IFFT conversion of the modulation described in FIG. 1D.

Figure 1J:
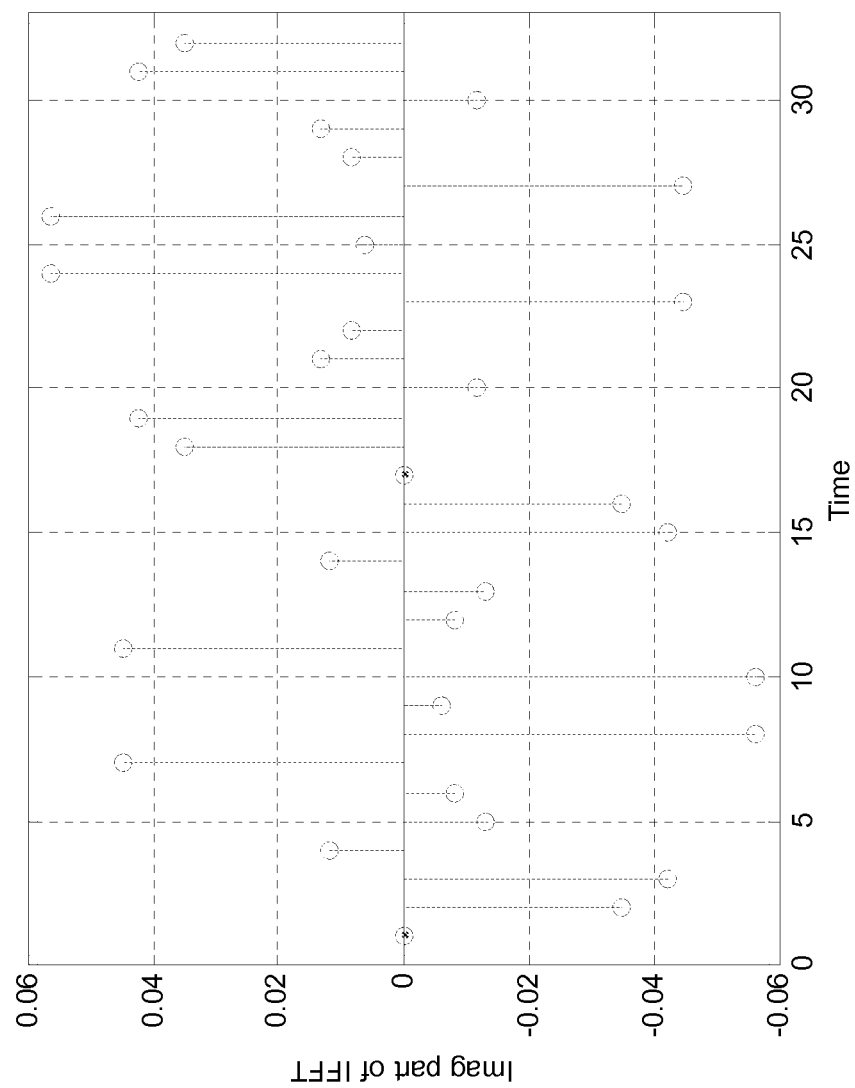
FIG. 1J depicts imaginary part of even-subcarrier modulated OFDM signal after IFFT.

FIG. 1J shows the imaginary part of the spectrum after IFFT conversion of the modulation described in FIG. 1D.

Figure 2:
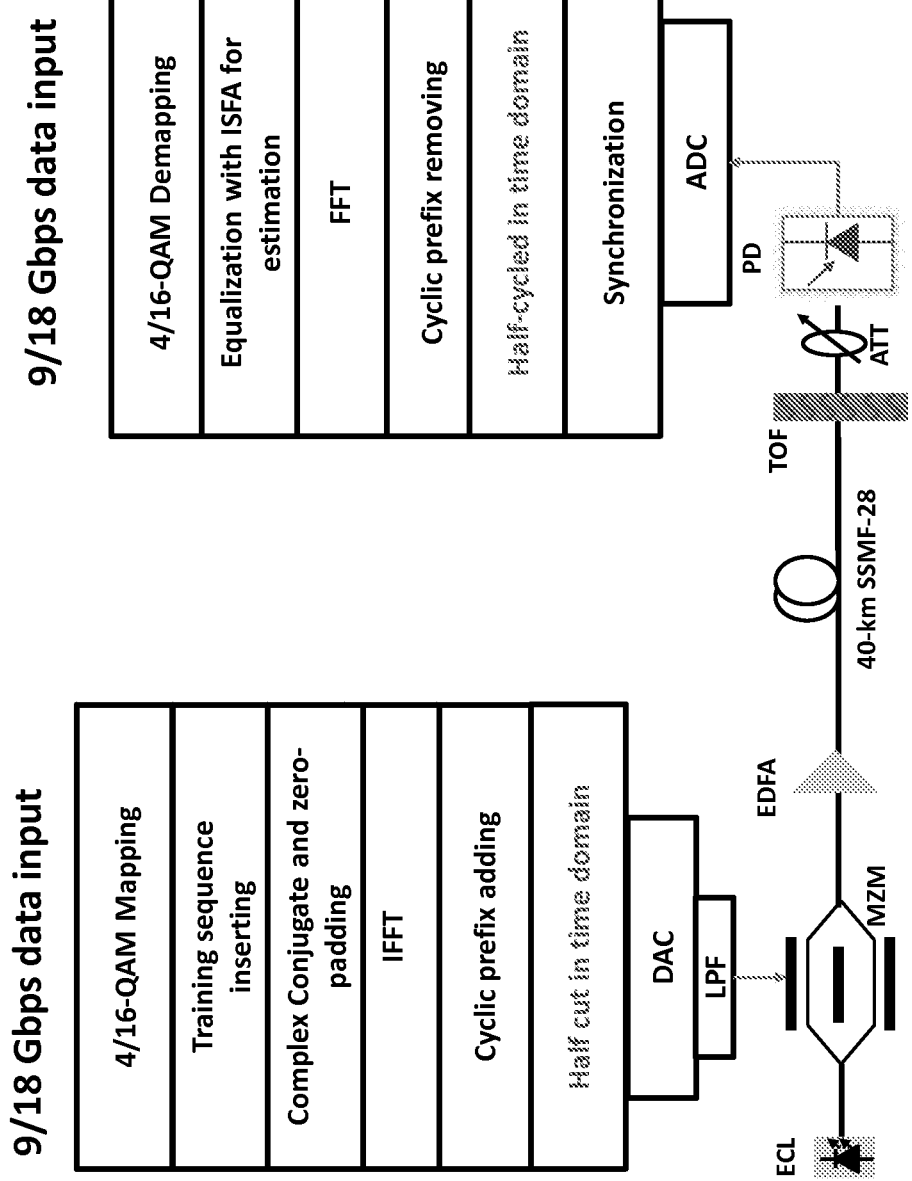
FIG. 2 depicts an experimental setup of half-cycled DDO-OFDM.
Figures 3A, 3B:
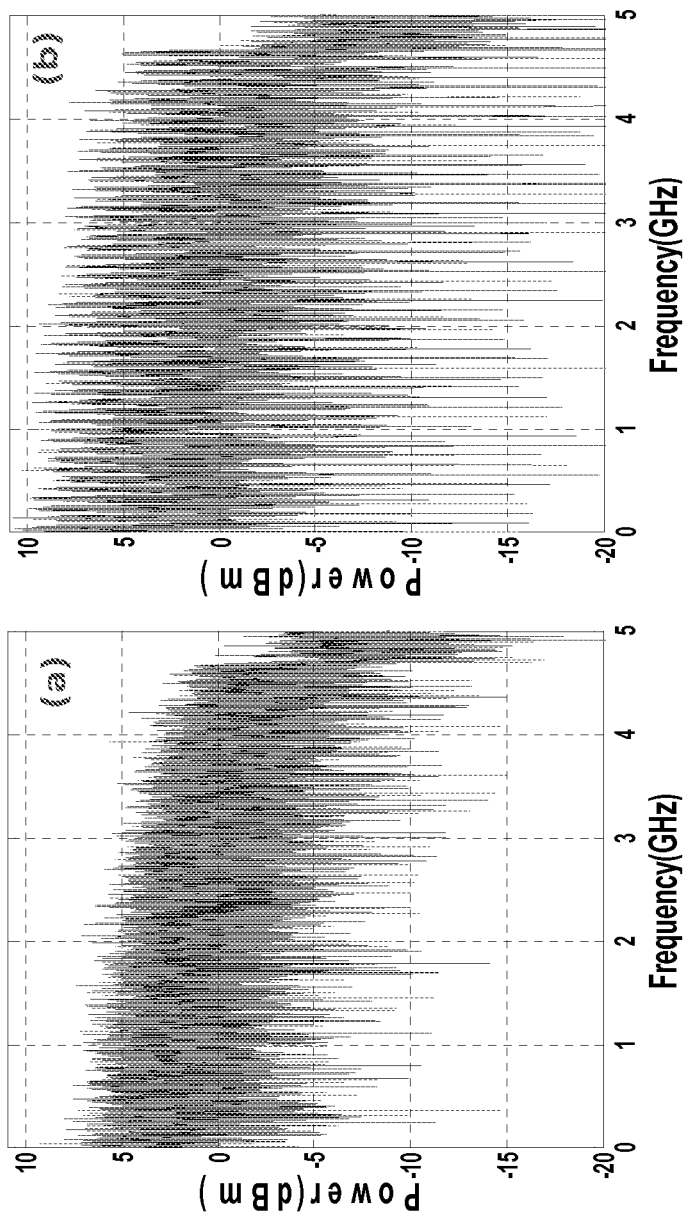
FIGS. 3A-3B depict the electrical spectra of received OFDM signal, (A) before half-cycled, (B) after half-cycled.

FIG. 2 shows an experimental setup of half-cycled DDO-OFDM. At the transmitter, an external cavity laser (ECL) at 1557.04 nm with less than 100-kHz linewidth and maximum output power of 14.5 dBm is modulated by intensity Mach-Zehnder modulator (MZM) driven by an electrical baseband OFDM signal. The OFDM signal is generated by an arbitrary waveform generator (AWG) with a 12-GSa/s sample rate. Here the FFT size for OFDM generation is 256, in which 200 subcarriers are employed with 100 conveying data in the positive frequency bins, the first subcarrier is set to zero for DC-bias and the rest 55 null subcarriers at the edge are reserved for oversampling. 4/16-QAM is taken on all the 100 information-bearing subcarriers. An 8-sample cyclic prefix (CP) is added to the 256 samples, giving 264 samples per one OFDM symbol. In the traditional OFDM signal transmission scheme, 264 samples are transmitted in one OFDM symbol, while only 132 samples are transmitted in the half-cycled OFDM scheme. One training sequence (TS) is inserted between every 160 OFDM data symbols to realize synchronization and obtain the channel response. The raw total bit rate in the system is 9.1/18.2 Gb/s for 4-QAM and 16-QAM transmission, respectively. One low pass filter (LPF) with 5-GHz bandwidth is used to filter aliasing products after digital to analog convertor (DAC) before injected into MZM. For optical OFDM modulation, the switching voltage is 3.4V and MZM is biased at 1.9 V at its linear region. The generated signal is injected into Erbium-doped fiber amplifier (EDFA) to adjust the launched power to 8 dBm into fiber. After 40-km standard single mode fiber-28 (SSMF-28) transmission, the OOFDM signal is filtered by a 0.33-nm bandwidth tunable optical filter (TOF) to block the out-of-band amplified spontaneous emission (ASE) noise from EDFA. An optical attenuator (ATT) is applied to adjust the received optical power for sensitivity measurement and then O/E conversion is implemented via an optical receiver with 3-dB bandwidth of 10 GHz. The converted electrical signal was captured by a real-time oscilloscope and then processed offline with a sample rate of 40 GSa/s. The resolution of the DAC in AWG and ADC in real-time oscilloscope respectively used at the transmitter and receiver are both 8 bits. The captured signal is then further processed with the offline DSP. The offline DSP procedure contains synchronization, half-cycled in time domain, CP removal, FFT, channel estimation with intra-symbol frequency-domain averaging (ISFA), one-tap equalization, 4-QAM or 16-QAM de-mapping and BER calculation. The BER was obtained by direct error counting with 320000 bits. The electrical spectra of received OFDM signal before and after half-cycled are shown in the FIGS. 3A and 3B, respectively.

In the experiment, three types of OFDM signal which include traditional OFDM signal, interleaved OFDM and half-cycled OFDM were tested in the system. The length of traditional and interleaved OFDM are the same in the time domain while the length of half-cycled OFDM is reduced to half. In order to verify the effectiveness of SSMI cancellation by half-cycled, 4-QAM and 16-QAM OFDM signal were both demonstrated in this paper. In the receiver of interleaved OFDM signal, the second half of one OFDM symbol was also copied from the first half to comparing the performance with half-cycled OFDM signal.

Figure 4A:
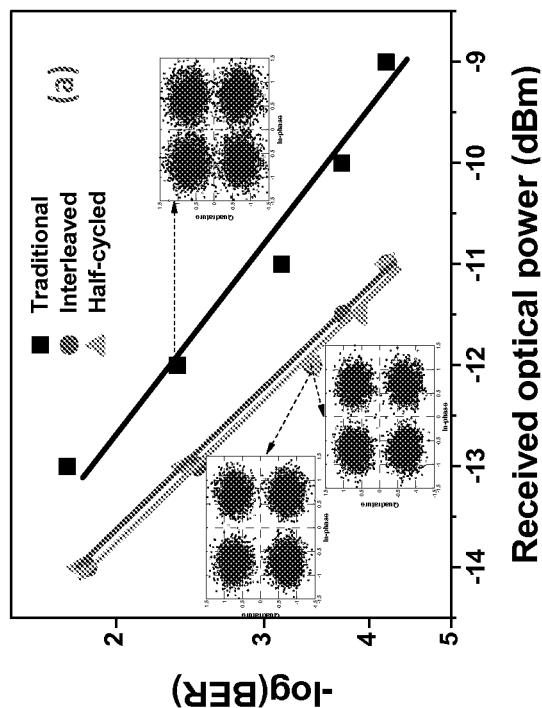
FIGS. 4A-4B depict bit error rate (BER) of 4-QAM OFDM versus received optical power, for (A) OBTB, (B) after 40-km SSMF-28.
Figure 4B:
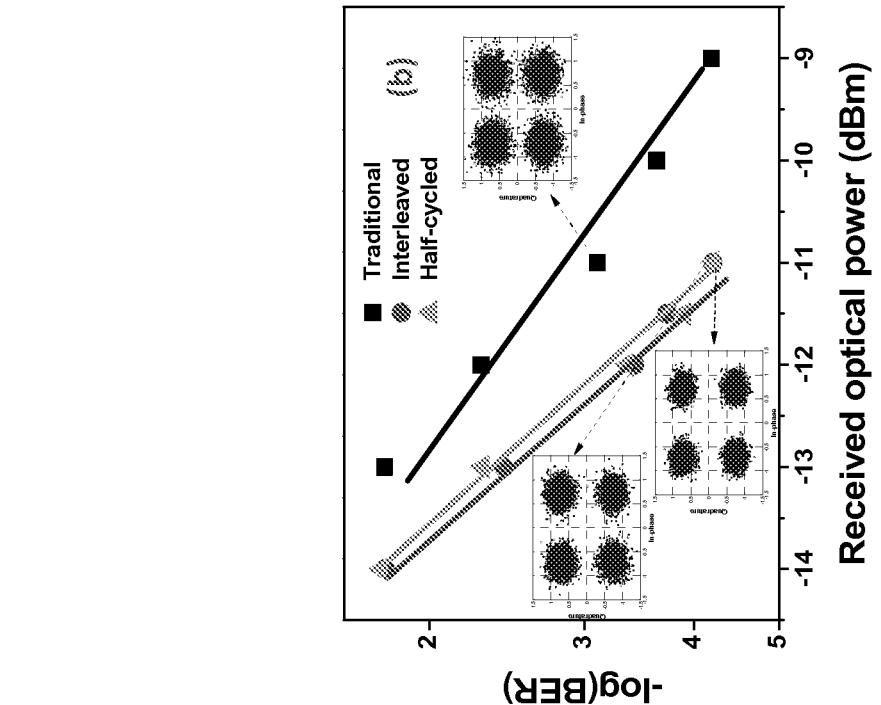

In the 4-QAM OFDM transmission, the BER versus received optical power was measured. The curves of the optical back to back (OBTB) and after 40-km SSMF-28 transmission are shown in the FIGS. 4A and 4B, respectively. The BER performance demonstrates that the receiver sensitivity was improved by 2 dB both at OBTB and after 40-km SSMF-28 transmission after SSMI cancellation with half-cycled OFDM compared to traditional OFDM signal. The difference between half-cycled OFDM and interleaved OFDM can be ignored, which proved that half-cycled OFDM is really practical. The constellations of three types of OFDM signal when the received optical power is −12 dBm at OBTB and when the received optical power is −11 dBm after 40-km SSMF-28 were inserted in FIGS. 3A and 3B, respectively.

Figure 5B:
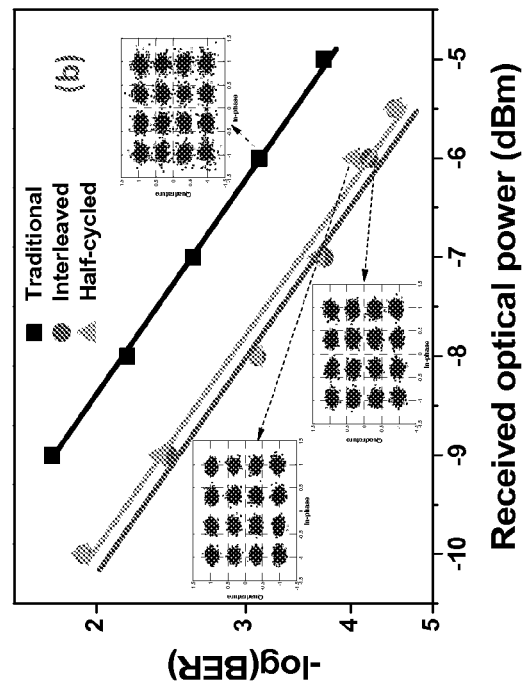
FIGS. 5A-5B depict BER of 16-QAM OFDM versus received optical power, (A) OBTB, (B) After 40-km SSMF-28.
Figure 5A:
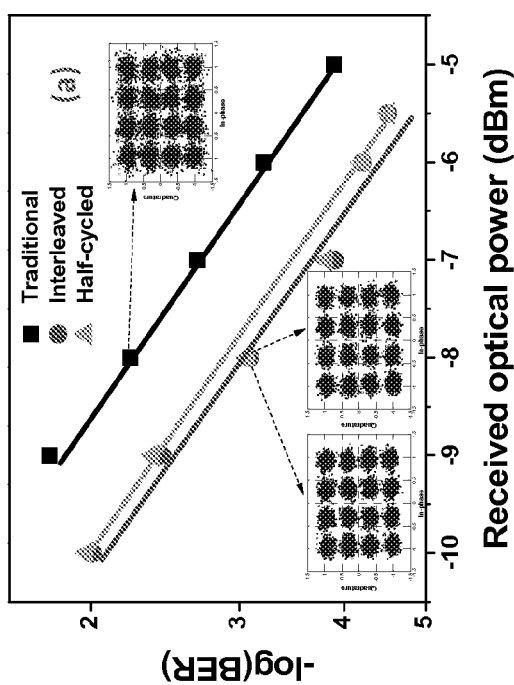
Figures 6A, 6B:
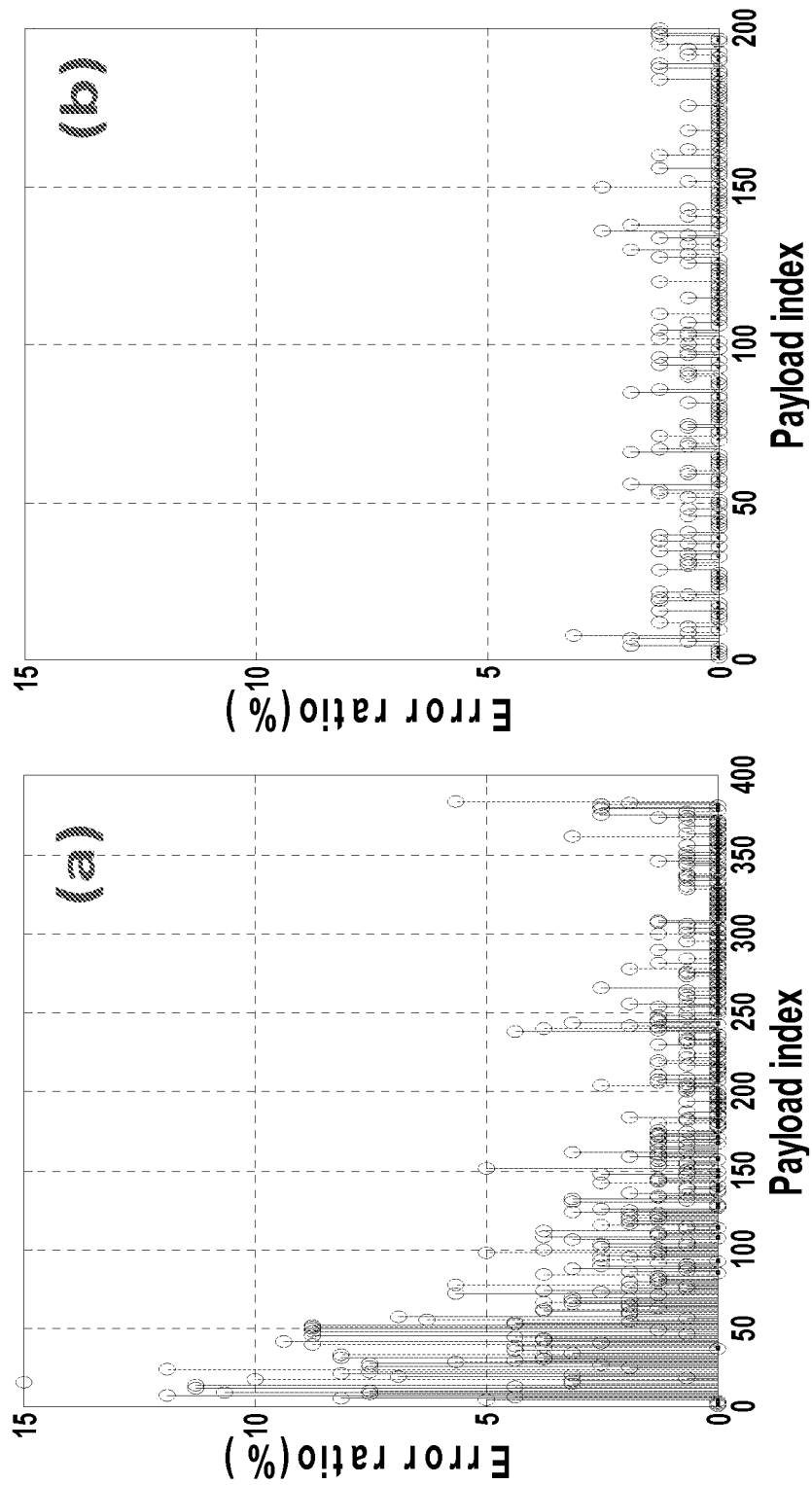
FIGS. 6A-6B depict error rate versus payload index in 16QAM-OFDM transmission, (A) traditional, (B) half-cycled.

In the 16-QAM OFDM transmission, the BER versus received optical power was also measured. The curves of the OBTB and after 40-km SSMF-28 transmission are shown in the FIGS. 5A and 5B, respectively. The receiver sensitivity was improved by 1.5 dB both at OBTB and after 40-km SSMF-28 transmission after SSMI cancellation with half-cycled OFDM compared to traditional OFDM signal. The constellations of three types of OFDM signal when the received optical power is −8 dBm at OBTB and when the received optical power is −6 dBm after 40-km SSMF-28 were inserted in FIGS. 4A and 4B, respectively. The error rate versus payload index of traditional and half-cycled 16-QAM OFDM after 40-km SSMF-28 when the received optical power is −7 dBm are shown in the FIGS. 6A and 6B, respectively. The error rate was significantly declined after SSMI cancellation with half-cycled technique.

In the 16-QAM OFDM transmission, the BER versus received optical power was also measured. The curves of the OBTB and after 40-km SSMF-28 transmission are Half-cycled technique was successfully demonstrated to overcome SSMI without SE reduction. The receiver sensitivity was improved by 2 and 1.5 dB in QPSK and 16QAM OFDM with 40-km SSMF-28 transmission, respectively.

Figure 8:
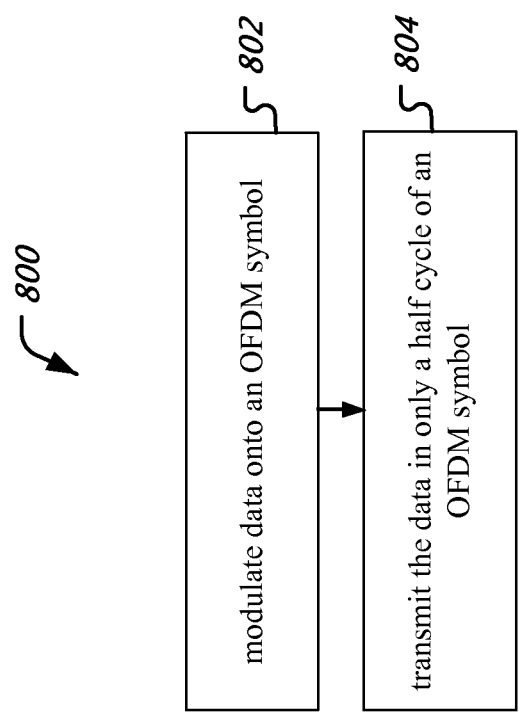
FIG. 8 depicts an example of a process of digital communication.

FIG. 8 is a flowchart representation of an example of a method 800 of digital communication. The method 800 includes modulating (802) data onto an OFDM symbol and transmitting (804) an optical orthogonal frequency division multiplexed (OFDM) signal includes transmitting a half cycle of an OFDM symbol during a time period of duration T/2. Here, T represents a symbol period of the OFDM symbol. The OFDM symbol comprises multiple subcarriers (e.g., 32 or 128 or 256 subcarriers) of which alternating subcarriers are suppressed by refraining from modulating with data. In some embodiments, the half cycle comprises the first half (e.g., time from 0 to T/2) of the symbol period. For example, in the previously described embodiments with respect to FIGS. 1H, 1I and 1J, an OFDM symbol comprises 32 subcarriers. The subcarriers can be indexed from 1 to 32. As depicted in FIGS. 1H, 1I and 1J, only the even subcarriers, which form every other, or alternating subcarriers, of the OFDM symbol (with subcarrier indices 2, 4, 6, . . . 32) are modulated with data. The odd subcarriers (indices 1, 3, 5, . . . 31) do not have any data modulated on them, and are suppressed (e.g., carry no information signal). Of course, in practical implementations, some radiated energy may be observed at the odd subcarriers due to noise and limitations of implementations such as carrier leakage.

In some embodiments, any half portion (contiguous or non-contiguous) of the symbol period could be transmitted). For example, in some embodiments, the second half of symbol period may be transmitted. As previously described the suppressed subcarriers may be the odd-numbered subcarriers of the OFDM symbol. Alternatively, the modulated subcarriers may be the even-numbered subcarriers of the OFDM symbol.

Figure 9:
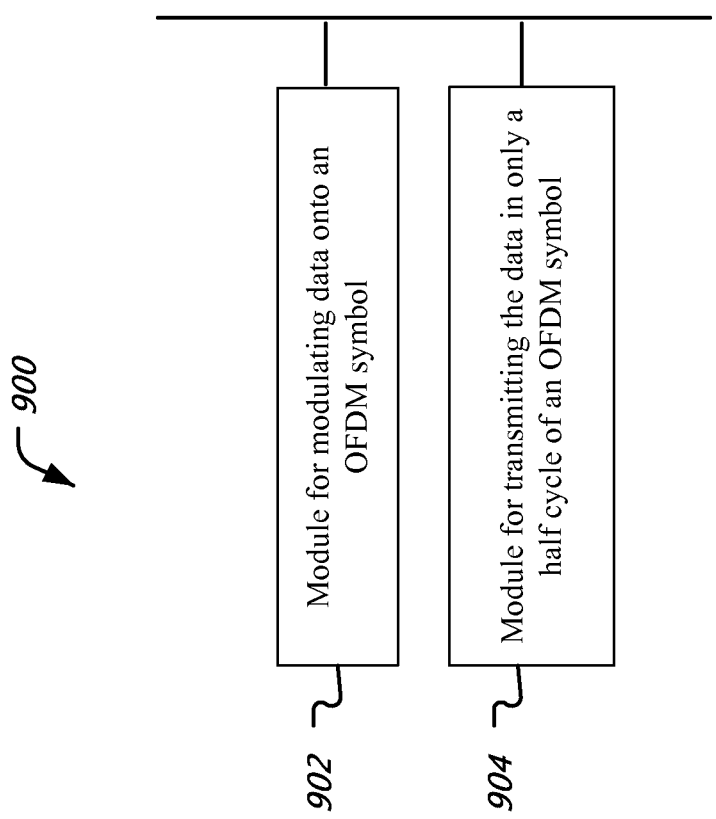
FIG. 9 is a block diagram representation of an example of a transmission apparatus for digital communication.

FIG. 9 depicts an example of an OFDM transmitter apparatus 900 comprises a module 902 for modulating data onto an OFDM symbol, a module 904 for generating an OFDM symbol by modulating a first set of subcarriers of the OFDM symbol with data and a second set of subcarriers of the OFDM symbol with no data. The first subset of subcarriers and the second set of subcarriers alternate with respect to each other in the frequency domain representation of the symbol, e.g., first set includes all odd-numbered subcarriers and the second set includes all even numbered subcarriers or vice versa.

Figure 10:
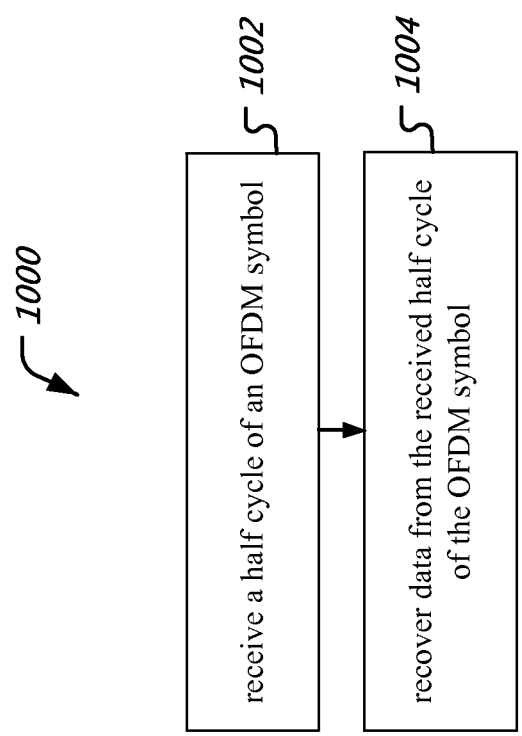
FIG. 10 depicts an example of a process of digital communication.
Figure 11:
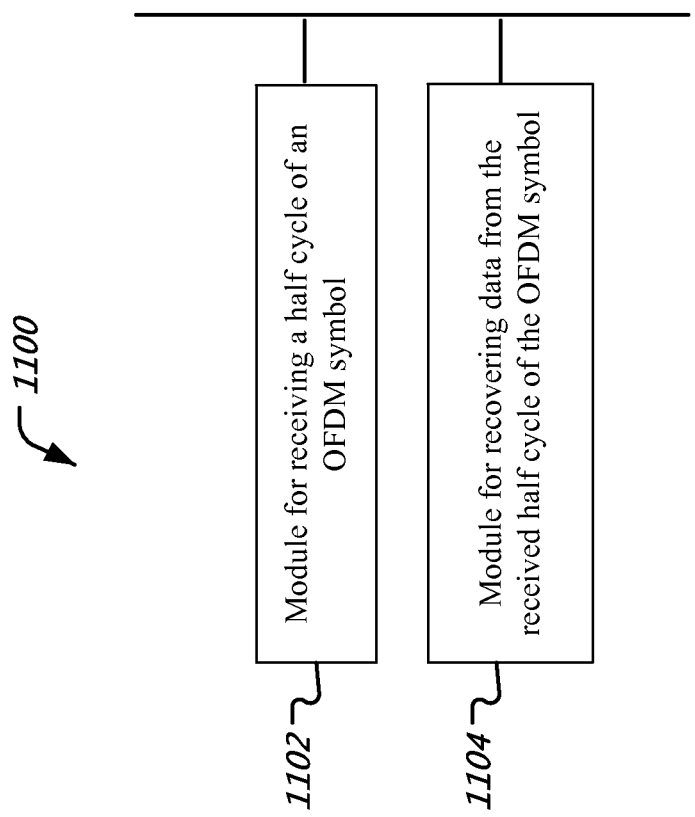
FIG. 11 is a block diagram representation of an example of a transmission apparatus for digital communication.

With respect to FIG. 10 and FIG. 11, in some embodiments, in a process 1000 of receiving a modulated signal, an optical OFDM signal is received (e.g., by module 1002) at a receiver 1100 by receiving (1002) a half cycle of an OFDM symbol of symbol period T in a time interval of duration T/2. The OFDM symbol is modulated using the previously discussed half-cycle modulation technique. The receiver 1100 (e.g., module 1104) then recovers data from the received half cycle (1004). The recovery of data may comprise processing the received half cycle to regenerate the second half cycle of the received signal. The regeneration may be performed using mathematical properties discussed in Equations (1) to (9), e.g., by simply replicating the received signal or by replicating a negative (flipped in sign or phase) version of the received signal).

An FFT operation is performed on the full cycle signal, comprising the received first half cycle and the regenerated second half cycle. The output of the FFT operation then provides a received copy of the transmitted OFDM symbol. Well known OFDM demodulation techniques can then be used to recover modulated data.

In some embodiments, the receiver may receive a half-cycle version of a next modulated OFDM symbol in the T/2 to T time period. The receiver may demodulate the half-cycle version of the first symbol, received in the initial half time period and the half cycle version of the second symbol, received in the latter half time period, in parallel to each other at the receiver.

It will be appreciated that the present document provides techniques for mitigating subcarrier to subcarrier mixing interference without reducing spectral efficiency of the signal when only the even subcarriers are applied for data modulation. In some disclosed embodiments accomplish the interference mitigation by modulating half of all available subcarriers (even subcarriers) and transmitting half of the corresponding time domain signal.

It will further be appreciated that while the disclosed techniques are discussed with reference to specific embodiments for optical communication, these techniques are equally applicable to other OFDM communication systems such as wireless (Long Term Evolution, 4G, 5G, 802.11 etc.) and wired (coaxial cable, home phone line, home power line, etc.) transmitters and receivers.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of transmitting an optical orthogonal frequency division multiplexed (OFDM) signal, comprising:
modulating data onto a first set of OFDM symbols, each of the first set of OFDM symbols comprising multiple subcarriers, wherein alternating subcarriers of the multiple subcarriers are suppressed from modulating the data and at least one subcarrier of the multiple subcarriers has a phase value selected from more than two possible phase values;
inserting a training sequence between the first set of OFDM symbols to form a second set of OFDM symbols, wherein the training sequence is for performing synchronization at a receiver;
transforming the second set of OFDM symbols into time domain, each of the second set of OFDM symbols having a symbol period of T; and
transmitting only a first half cycle of each of the second set of OFDM symbols during a time period of duration T/2, wherein a second half cycle of each of the second set of OFDM symbols is identical or negatively identical to the first half cycle of each of the second set of OFDM symbols.

2. The method of claim 1, wherein:
the first half cycle comprises first half of the symbol period.

3. The method of claim 2, further comprising:
transmitting a first half cycle of another OFDM symbol in a second half of the symbol period of an OFDM symbol.

4. The method of claim 3, wherein the first half is earlier in time in relation to the second half.

5. The method of claim 1, wherein the suppressed subcarriers comprise even-numbered subcarriers of the OFDM symbol.

6. The method of claim 1, wherein the suppressed subcarriers comprise odd-numbered subcarriers of the OFDM symbol.

7. The method of claim 1, further comprising:
filtering, prior to transmitting, the second set of OFDM symbols through a lowpass filter.

8. An orthogonal frequency domain multiplexed (OFDM) transmitter apparatus, comprising:
a symbol generator module configured to generate a first set of OFDM symbols,
wherein a frequency domain representation of each of the first set of OFDM symbols comprises a first set of subcarriers on which data is modulated and a second set of subcarriers on which no data is modulated, wherein subcarriers from the first set alternate in frequency domain with subcarriers from the second set and at least one subcarrier of the subcarriers in the first set and the second set has a phase value selected from more than two possible phase values; and
wherein a time domain representation of each of the first set of OFDM symbols comprises a first half cycle in a first time interval followed by a second half cycle in a second time interval of same duration as the first time interval and the second half cycle of each of the first set of OFDM symbols is a duplicate or a negative duplicate of the first half cycle;

a training sequence inserter configured to insert a training sequence between the first set of OFDM symbols to form a second set of OFDM symbols, wherein the training sequence is for performing synchronization at a receiver; and a transmission module configured to transmit only the first half cycle of each of the second set of OFDM symbols.

9. The apparatus of claim 8, wherein:
the first set of subcarriers comprises odd subcarriers of each of the first set of OFDM symbols.

10. The apparatus of claim 8, wherein:
the first set of subcarriers comprises even subcarriers of each of the first set of OFDM symbols.

11. A method of receiving an optical orthogonal frequency domain multiplexed (OFDM) signal, comprising:

receiving half cycles of a first set of OFDM symbols, wherein each of the half cycle has a time period of duration T/2, T representing a symbol period of each of the first of OFDM symbols, and wherein the first set of OFDM symbols includes a training sequence and a second set of OFDM symbols onto which data is modulated;

recovering the data from the half cycles of the second set of OFDM symbols, wherein each of the second set of OFDM symbols comprises multiple subcarriers of which alternating subcarriers are suppressed by refraining from modulating with data, wherein at least one subcarrier of the multiple subcarriers has a phase value selected from more than two possible phase values, and wherein a second half cycle of the OFDM symbol is recovered by replicating or negatively replicating the received half cycle of the OFDM symbol;

performing synchronization using the training sequence.

12. The method of claim 11, wherein:
the half cycle comprises a first half of the symbol period.

13. The method of claim 12, further comprising:
receiving a half cycle of another OFDM symbol in a second half of the symbol period.

14. The method of claim 13, wherein the first half is earlier in time in relation to the second half.

15. The method of claim 11, wherein the suppressed subcarriers comprise even-numbered subcarriers of the OFDM symbol.

16. The method of claim 11, wherein the suppressed subcarriers comprise odd-numbered subcarriers of the OFDM symbol.

17. An orthogonal frequency domain multiplexed (OFDM) reception apparatus, comprising:

an optical module configured to receive half cycles of a first set of OFDM symbols, wherein each of the half cycle is transmitted in a first time interval having a duration T/2, T representing a symbol duration of each of the OFDM symbols, and wherein the first set of OFDM symbols includes a training sequence and a second set of OFDM symbols onto which data is modulated;

a demodulator configured to recover the data from the half cycles of the second set of OFDM symbols and;

a synchronizer configured to perform synchronization using the training sequence;

wherein a frequency domain representation of each of the second set of OFDM symbols comprises a first set of subcarriers on which the data is modulated and a second set of subcarriers on which no data is modulated, wherein subcarriers from the first set alternate in frequency domain with subcarriers from the second set and at least one subcarrier of the subcarriers in the first set and the second set has a phase value selected from more than two possible phase values; and wherein a time domain representation of each of the OFDM symbols comprises a first half cycle in a first time interval followed by a second half cycle in a second time interval of same duration as the first time interval, and the second half cycle of each of the second set of OFDM symbols is identical or negatively identical to the first half cycle of each of the second set of OFDM symbols.

18. The apparatus of claim 17, wherein:
the first set of subcarriers comprises odd subcarriers of the OFDM symbol.

19. The apparatus of claim 17, wherein:
the first set of subcarriers comprises even subcarriers of the OFDM symbol.

20. An optical communication system, comprising:

a symbol generator configured to generate a first set of OFDM symbols, wherein a frequency domain representation of each of the first set of OFDM symbols comprises a first set of subcarriers on which data is modulated and a second set of subcarriers on which no data is modulated, wherein subcarriers from the first set alternate in frequency domain with subcarriers from the second set and at least one subcarrier of the subcarriers in the first set and the second set has a phase value selected from more than two possible phase values; and wherein a time domain representation of each of the first set of OFDM symbols comprises a first half cycle in a first time interval followed by a second half cycle in a second time interval of same duration as the first time interval and the second half cycle of each of the first set of OFDM symbols is a duplicate or a negative duplicate of the first half cycle;

a training sequence inserter configured to insert a training sequence between the first set of OFDM symbols to form a second set of OFDM symbols;

a transmitter that is configured to transmit only the first half cycle of each of the second set of OFDM symbols;

a receiver that is configured to receive half cycles of the second set of OFDM symbols;

a demodulator configured to recover the data from the half cycles of the first set of OFDM symbols and;

a synchronizer configured to perform synchronization using the training sequence.

* * * * *